United States Patent [19]

Johnson et al.

[11] Patent Number: 4,525,094

[45] Date of Patent: Jun. 25, 1985

[54] POWDERED METAL, FLANGED BUSHING FOR SECURING MACHINE ELEMENTS TO SHAFTS

[75] Inventors: James D. Johnson, Greer, S.C.; Byron B. Belden, Fletcher, N.C.; Terrence A. Kamp, Simpsonville, S.C.

[73] Assignee: Reliance Electric Company, Greenville, S.C.

[21] Appl. No.: 580,462

[22] Filed: Feb. 15, 1984

[51] Int. Cl.³ .............................................. F16B 2/00
[52] U.S. Cl. ...................................... 403/11; 403/16; 403/370
[58] Field of Search ................. 403/370, 371, 16, 11, 403/12

[56] References Cited

U.S. PATENT DOCUMENTS

| | | |
|---|---|---|
| 2,402,743 | 4/1946 | Firth . |
| 2,407,032 | 9/1946 | Myers ........................... 403/370 X |
| 2,509,711 | 12/1950 | Williams . |
| 2,519,958 | 5/1950 | Firth . |
| 2,676,849 | 4/1954 | Houck et al. ................... 403/370 X |
| 2,763,158 | 6/1956 | Firth . |
| 2,856,211 | 7/1958 | Firth . |
| 2,986,416 | 9/1961 | Firth . |
| 3,134,268 | 10/1964 | Firth . |
| 3,368,833 | 6/1968 | Chung . |
| 3,677,583 | 4/1972 | Steinke . |

OTHER PUBLICATIONS

Reliance Electric Co. Catalog, QD Bushings, pp. D1–D13.
Reliance Electric Co. Bulletin A988 (120.7), Technical Data—Bushings.
Reliance Electric Co. Bulletin A988 (100.2), Bushings & Hubs.

*Primary Examiner*—Andrew V. Kundrat
*Attorney, Agent, or Firm*—Marmaduke A. Hobbs

[57] ABSTRACT

A split, circular flanged bushing for securing driving or driven elements such as sheaves, pulleys, and the like to a rotatable shaft, having an integrally formed key in the center opening of the bushing for insertion in a corresponding keyway in the shaft. The bushing is formed in a sintering operation and increased density is imparted to fillets or junctions between the flange and the outer wall of the body, thereby providing increased resistance to stress fatigue in these critical areas. Fillets between the key and the inner wall of the body are provided to distribute the stress concentration inherent in these areas.

16 Claims, 8 Drawing Figures

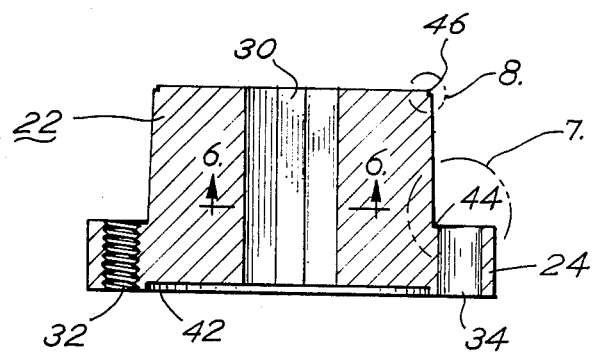
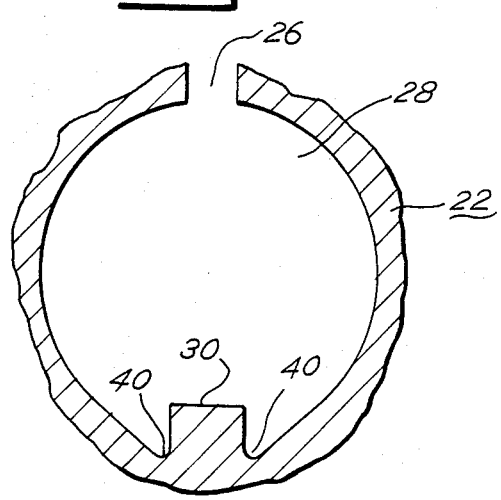
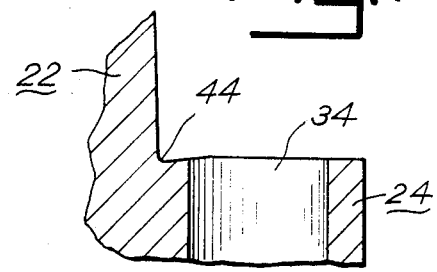
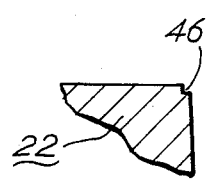

POWDERED METAL, FLANGED BUSHING FOR SECURING MACHINE ELEMENTS TO SHAFTS

BACKGROUND OF THE INVENTION

A well known and widely used construction for securing sheaves, pulleys, sprockets, couplings, and the like to rotatable shafts consists of a split, tapered bushing disposed around the shaft, with the body of the bushing disposed between the shaft and the hub of one of the driving or driven elements mentioned above. The hubs normally have a tapered inner surface which corresponds to the tapered outer surface of the bushing. One particular type of bushing used for this purpose has a flange disposed around the outside and adjacent the body or barrel of one end of the bushing with a plurality of threaded bores therein for securing the bushing to the hub. Screws are inserted through the flange into corresponding threaded bores in the hub and, as the screws are tightened, the tapered surfaces of the bushing and hub are drawn together. This, in turn, causes the split bushing to contract around and securely grip the shaft, thereby securing the assembly together and preventing relative rotation between the shaft, bushing, and hub. Reverse mounting is also possible where, for example, there is limited space adjacent the flanged end of the bushing. In this case, screws are inserted through unthreaded holes in the hub, and into corresponding threaded bores in the flange. As the screws are tightened, the tapered surfaces are drawn together and the bushing contracts around the shaft as described above.

In many installations, a key with a corresponding keyway is provided between the shaft and the bushing and/or between the bushing and the hub to further guard against relative rotation between the members. The bushings are normally produced either by machining the bushings from blanks of cast iron, or by a powdered metal process which eliminates much of the machining required in producing the bushing from the cast iron blanks.

In normal use, the bushings are often subjected to very high torque, especially where frequent reversal of rotation is effected. Any loosening of the secured elements becomes progressively worse as operations proceed, due to the pounding between the parts, and may ultimately result in damage to one or more of the elements. In addition, fatigue stresses are concentrated in certain areas of the bushings, specifically the fillets or junctions between the flange and the barrel, and the fillets between the key and the barrel. Past efforts to overcome these difficulties have been concentrated either on reinforcement of the areas subject to stress, resulting in increased weight and manufacturing expenses, or on designing the bushings to permit a certain amount of flexing, reducing the stress concentration but resulting in an overall weakening of the bushing structure.

SUMMARY OF THE INVENTION

It is, therefore, one of the principal objects of the present invention to provide a flanged bushing, produced by a powdered metal process, in which the areas of stress concentration around the flange are reinforced by increasing the density of the bushing in these critical areas, thereby strengthening the bushing structure and providing better operating characteristics.

Another object of the present invention is to provide a fillet or concave junction between each side of the key and the barrel or body of the bushing, thereby providing an easier fit over the shafting keyway or keyseat and minimizing stress between the key and the barrel or body of the bushing.

A further object of the present invention is to provide a powdered metal flanged bushing which affords a long service life, due to its reinforced construction, and which is economical to produce and to use.

These and other objects are attained by the present invention which relates to a flanged bushing of powdered metal construction, having a circular body member with a center opening and a flange disposed around one end thereof. The body and the flange are split longitudinally and radially to allow compression around the shaft when the bushing is installed. An inwardly projecting key is provided in the center opening of the body member for seating in a keyway in the particular shaft. The fillets or concave junctions between the key and the inner wall of the body member are shaped to distribute stress concentration, and the fillets between the flange and the outer wall of the body member are provided with increased density during the forming of the bushing, thereby providing increased resistance to stress fatigue in these critical areas. Threaded and unthreaded bores are provided in the flange, the unthreaded bores aligning with threaded holes in the hub for installing the bushing, and the threaded bores aligning with solid sections of the end wall of the hub for removing the bushing as screws are threaded through the threaded bores and against the hub wall, thereby forcing the bushing outward.

The bushing may also be reverse mounted where space is limited adjacent the flanged end of the bushing or where convenient. Using this method, screws are inserted through unthreaded holes in the hub and into the threaded bores in the flange. For removing the bushing, screws are threaded through threaded bores in the hub and against a corresponding solid portion of the flange, thereby forcing the hub and bushing apart.

Various other objects and advantages of the present invention will become apparent from the following description, with reference to the accompanying drawings.

BRIEF DESCRIPTION OF THE DRAWINGS

FIG. 5 is a cross-sectional view of the flanged bushing shown in the preceding figures, illustrating the areas of increased density, the section taken on line 5—5 of FIG. 2;

FIG. 6 is a cross-sectional view detailing the fillets between the key and the body, the section being taken on line 6—6 of FIG. 5;

FIG. 7 is a fragmentary cross-sectional view of the inner fillet having increased density between the flange and the body, the view being taken from circle 7 of FIG. 5; and FIG. 8 is a fragmentary cross-sectional view of the groove or indentation formed in the outer end of the body, the view being taken from circle 8 of FIG. 5.

DETAILED DESCRIPTION OF THE PREFERRED EMBODIMENT

Figure 1:
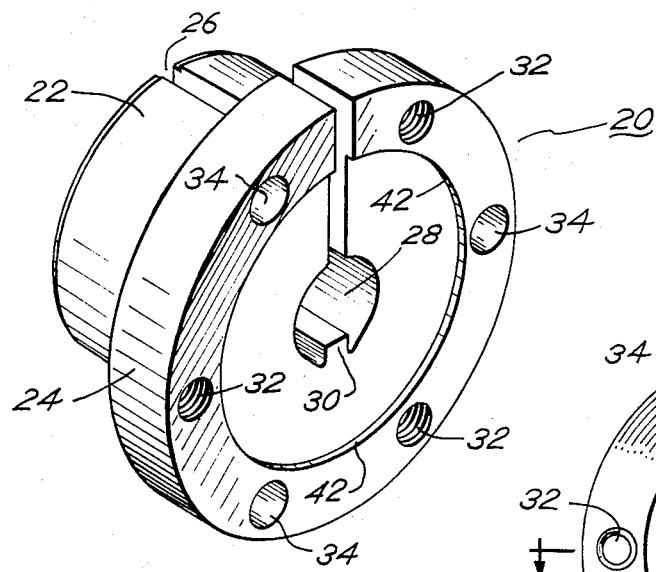
FIG. 1 is a perspective view of the flanged bushing embodying the present invention, illustrating the outer fillet between the flange and the body.
Figure 2:
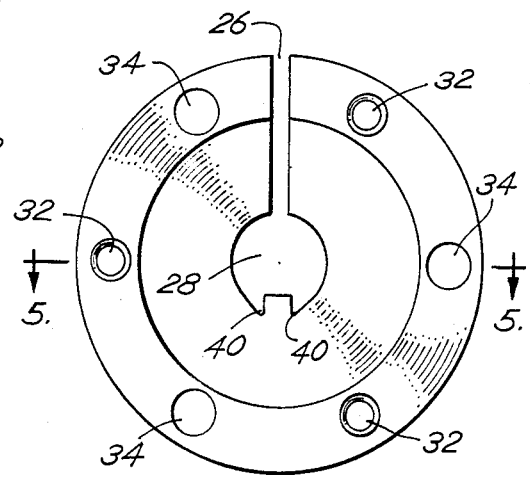
FIG. 2 is an end view of the flanged bushing shown in the preceding figure, illustrating the recessed and shaped areas between the key and the body.
Figure 3:
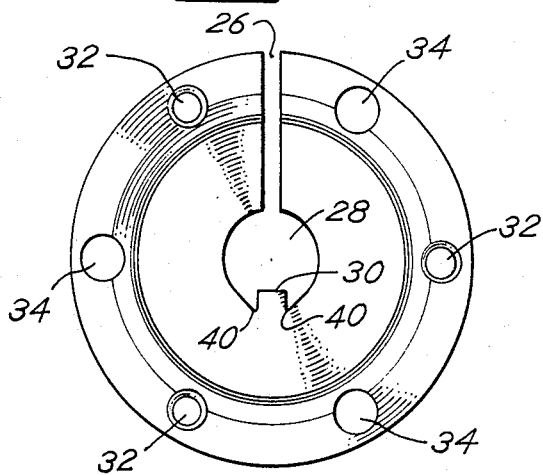
FIG. 3 is a view of the end of the flanged bushing opposite that seen in FIG. 2.
Figure 4:
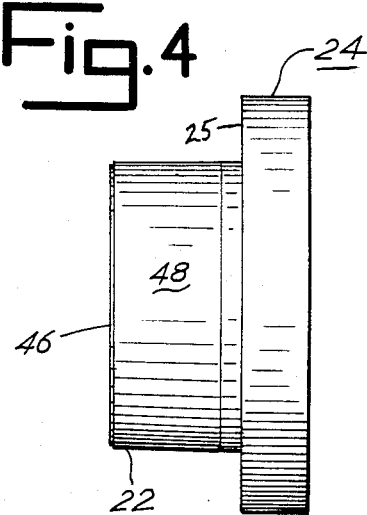
FIG. 4 is a side elevational view of the flanged bushing illustrating the tapered body.

Referring now more specifically to the drawings, and to FIG. 1 in particular, numeral 20 designates generally the flanged bushing embodying the present invention. The bushing has a cylindrical body member or barrel 22, the lower end of which is surrounded by a circular flange 24. For convenience of description, the flanged end of the bushing will be referred to as the lower end and the small end as the upper end, this orientation being illustrated in FIG. 5, notwithstanding the fact that the bushing may be used in any position.

The bushing of the present invention is of the split-bushing type, and a longitudinal and radial slot 26 is provided in the barrel and in the flange to permit contraction of the bushing around a shaft (not shown) upon installation. In the center bore 28 of the bushing is an integrally formed key 30, designed for insertion into a corresponding keyway (not shown) in the particular shaft on which the bushing is mounted. The flange 24 is provided with a plurality of threaded bores or holes 32 and a plurality of unthreaded bores or holes 34. For installation in a corresponding hub, suitable screws (not shown) are inserted through unthreaded bores 34 into corresponding threaded holes in the hub (not shown), and tightened to draw the bushing into the hub. For removing the bushing, suitable means, such as screws, are threaded through threaded bores 32 and tightened therein. As the screws contact the solid wall of the hub, the bushing is forced outwardly, away from its engagement with the hub, and removal is effected.

The present bushing may also be mounted from the reverse side in a suitable hub where space adjacent the flanged end is at a premium, or due to other factors, such as convenience. In this instance, suitable means, such as screws, are inserted through unthreaded holes in the hub (not shown) and threaded into threaded bores 32 in the flange 24. As the screws are tightened, the bushing is drawn into the hub as described above. Removal may also be effected from the reverse side by threading screws through threaded bores in the hub and against the inner surface 25 of flange 24, thereby forcing the hub and bushing apart.

The flanged bushing of the present invention is formed in a sintering operation. Briefly, this operation entails filling a die with a powdered metal and subjecting the metal powder to substantial pressure in a suitable press, effecting a cold-welding of the individual powder grains. The compressed bushing is then sintered, entailing subjecting the bushing to a predetermined, elevated temperature in a controlled atmosphere furnace to increase the bond strength. The furnace temperature is typically sixty to eighty percent of the melting point temperature of the particular metal used, and the atmosphere is controlled to prevent oxidation of the metal particles before bonding is effected. Especially where such powdered metal technology is used, the fillets or junctions between two non-continuous surfaces may cause stress fatigue problems, because it is difficult to maintain uniform pressure in these areas. Consequently, these areas have lower densities, and are subject to failure under stress. Therefore, the present invention has taken these factors into account, and the bushings have been designed either to distribute the stress concentration over a greater area or to introduce increased density into those areas where fatigue stresses are of particular concern. The first of such areas are the junctions or fillets 40 between the inside circumference of the barrel 22, or the bore 28, and the key 30. Indentations are provided in the die used to form the present flanged bushing to provide radiused fillets 40. This allows an easier fit over the shafting keyway or keyseat. Providing fillets, with their concave shaping, relieves the stress concentration, which is common to bushings having junctures formed at right angles, thereby distributing the stress over a larger area and, consequently, increasing the strength.

Similar procedures are used to form the fillets on both sides of flange 24. Die indentations are provided to concentrate the pressing forces, creating a bottom or lower fillet 42 between the flange and the barrel, and a top or upper fillet 44, shown in FIGS. 5 and 7, between the opposite side of the flange and the barrel. These fillets have increased density and consequently greater strength than conventional bushings of this type, thereby creating a stronger flange and improved operating performance. The end or periphery of barrel 22 is provided with an inwardly angled surface or annular recess 46, shown in FIGS. 5 and 8, to assure a secure fit between the tapered, outer circumferential surface 48 of the barrel and the corresponding reversely tapered inner circumferential surface of the particular hub (not shown), since any outward projections in this area would prevent the proper seating required between the tapered surfaces. The use of a sintering operation also permits slot 26 to be formed in the molding process, whereas machined bushings require that the slot be cut after the bushing has been formed.

In the use and operation of the flanged bushing embodying the present invention, the bushing 20 is slipped over the end of a shaft with key 30 aligned with the corresponding keyway in the shaft. The bushing is easily assembled and aligned in this manner due to the fillets 40 between the key and the inside circumference of barrel 22. The barrel is then moved into engagement with the hub of the driving or driven member, such as a sheave, gear, or the like. Suitable screws are then inserted first through the unthreaded bores 34 in flange 24 and then threaded into corresponding threaded bores in the hub (not shown). As the screws are tightened, the tapered, outer circumferential surface 48 of the barrel is drawn into the reversely tapered, inner circumferential surface of the hub, and as the tapered surfaces are drawn together, the concentrating forces compress the sides of barrel 22, causing the slot 26 to close, thereby securing the bushing on the shaft, while at the same time securing the bushing in the hub. The bushing may be removed from the shaft by threading suitable screws into the threaded bores 32 in the flange. These screws, when tightened against the wall of the hub, force the bushing outward, away from its engagement with the hub.

The present bushing 20 may also be mounted in a suitable hub from the opposite side where convenient, or where necessary due to space limitations adjacent the flanged end. In this reverse mounting procedure, barrel 22 is moved into engagement with the hub and suitable screws are first inserted through unthreaded holes in the hub and then threaded into threaded bores 32 in flange 24. As the screws are tightened, the tapered surfaces of the bushing and hub are drawn together, compressing the bushing around the shaft as described above. The bushing may then be removed from this side, also by threading screws through threaded bores in the hub and against the inner surface 25 of flange 24. As the screws are turned against the flange, the bushing is forced outward, away from its engagement with the hub.

The fillets 40 between the key and the inside of the barrel, and the additional fillets 42 and 44 between the bottom and top, respectively, of the flange and the barrel, are reinforced, due to the concave shaping and increased density imparted to these areas during the molding and sintering operations. This reinforcement assures a bushing having superior resistance to stress fatigue, and a correspondingly increased service life.

While only one embodiment of a flanged bushing has been shown and described in detail herein, various changes and modifications may be made without departing from the scope of the present invention.

I claim:

1. A powdered metal, flanged bushing for securing machine elements to a shift, said machine elements having a hub with a central opening, said bushing comprising a generally cylindrical, tapered body member split longitudinally and radially, and having a large end and a small end and a central bore, a flange split longitudinally and radially disposed on said large end of said body member and having a portion projecting outwardly from said large end, a key formed integrally with said body member in said central bore and projecting inwardly and axially therein, said body member having fillets at the points of junctures between said flange and said body member on both sides of said flange for increased density at said points, and a plurality of holes formed in said flange for receiving securing means for selectively securing said bushing in the opening in the hub and onto the shaft and for removing said bushing from the hub opening, the small end of said body member having an annular recess at the periphery for facilitating seating of said bushing in a hub.

2. A powdered metal, flanged bushing as defined in claim 1 in which said body member has an outer circumferential surface and said outer surface is tapered inwardly from a point near said flange toward said small end.

3. A powdered metal, flanged bushing as defined in claim 1 in which said plurality of holes includes threaded and unthreaded holes, said threaded holes for effecting removal of said bushing from a hub upon insertion of securing means, and said unthreaded holes for receiving securing means for mounting said bushing in a hub.

4. A powdered metal, flanged bushing as defined in claim 1 in which said portion of said flange has an outer surface and an inner surface adjacent and substantially perpendicular to said body member for forming an abutment against which securing means are deployed for effecting removal of said bushing from the hub.

5. A powdered metal, flanged bushing as defined in claim 4 in which said holes include threaded and unthreaded holes, said threaded holes for receiving securing means inserted first through corresponding unthreaded holes in the hub for reversely mounting said bushing in the hub.

6. A powdered metal, flanged bushing for securing a hub having threaded and unthreaded bores therein to a rotatable shaft, comprising a split circular body member having two ends and a center opening, a split circular flange disposed around one of said ends, a key member formed integrally with said body member and disposed in said center opening, said body member and said flange at the areas of juncture therebetween having increased density for resisting stress.

7. A powdered metal, flanged bushing as defined in claim 6 in which a circular wall defines said center opening in said body member and said key is integrally formed with, and projects outwardly from said wall and intersects portions of said wall, and the areas between said walls and key being radiused for distributing stress concentration.

8. A powdered metal, flanged bushing as defined in claim 7 in which said body member has an outer circumferential surface, and said outer surface tapers inwardly away from said flanged end.

9. A powdered metal, flanged bushing as defined in claim 8 in which said flange has threaded and unthreaded holes disposed axially therein, said unthreaded holes for receiving screws for insertion into threaded holes in a hub for securing said bushing to the hub, and said threaded holes for receiving screws for disengaging said bushing from a hub.

10. A powdered metal, flanged bushing as defined in claim 6 in which said flange has threaded and unthreaded holes disposed axially therein with solid portions adjacent said holes for forming an abutment against which screws are deployed after being threaded through threaded bores in the hub for removing said bushing from the hub, and said threaded holes are for receiving screws inserted first through unthreaded bores in the hub for mounting said bushing in the hub.

11. A powdered metal, flanged bushing as defined in claim 6 in which said flange projects outwardly from said one end of said body member.

12. A powdered metal, flanged bushing as defined in claim 11 in which the end of said body member opposite said one end has an annular recess at the periphery for facilitating seating of said bushing in a hub.

13. A powdered metal, flanged bushing for securing a machine element to a shaft, comprising a split cylindrical body member having a center opening and a radial and longitudinal slit therethrough, said body member including two ends and inner and outer circumferential surfaces, a split flange disposed around one of said ends of said body member, a key disposed on said inner circumferential surface of said body member for insertion in a corresponding keyway in a shaft, said body member and said flange being of a certain defined density, and including points of intersection between said flange and said outer surface with a density greater than that of said body member and flange.

14. A powdered metal, flanged bushing as defined in claim 13 in which said flange includes a plurality of holes extending axially therethrough, some of said holes being unthreaded and some of said holes being threaded.

15. A powdered metal, flanged bushing as defined in claim 13 in which said outer circumferential surface is tapered inwardly away from said flange and in which fillets are provided at the points of intersection between said key and said inner surface for distributing stress concentration.

16. A powdered metal, flanged bushing as defined in claim 15 in which said end of said body member opposite said flanged end has an annular groove at the periphery thereof for facilitating seating of said bushing in a hub.

* * * * *